US012594619B2

(12) United States Patent
Petrone et al.

(10) Patent No.: US 12,594,619 B2
(45) Date of Patent: Apr. 7, 2026

(54) SYSTEMS AND METHODS FOR EX-SITU BAKEOUT OF DIFFERENTIALLY PUMPED VACUUM CHAMBERS

(71) Applicant: KLA Corporation, Milpitas, CA (US)

(72) Inventors: Nicholas Petrone, San Jose, CA (US); Lawrence Muray, Moraga, CA (US)

( * ) Notice: Subject to any disclaimer, the term of this patent is extended or adjusted under 35 U.S.C. 154(b) by 0 days.

(21) Appl. No.: 19/091,421

(22) Filed: Mar. 26, 2025

(65) Prior Publication Data

US 2025/0339918 A1     Nov. 6, 2025

Related U.S. Application Data

(60) Provisional application No. 63/642,095, filed on May 3, 2024.

(51) Int. Cl.
*B23K 15/06* (2006.01)
*B23K 15/08* (2006.01)
*B23K 101/36* (2006.01)

(52) U.S. Cl.
CPC .............. *B23K 15/06* (2013.01); *B23K 15/08* (2013.01); *B23K 2101/36* (2018.08)

(58) Field of Classification Search
None
See application file for complete search history.

(56) References Cited

FOREIGN PATENT DOCUMENTS

| | | | |
|---|---|---|---|
| CN | 102495237 B | 10/2013 | |
| CN | 104451044 A | 3/2015 | |
| CN | 110828328 A | 2/2020 | |
| EP | 0806499 B1 | 12/2001 | |
| JP | H09246347 A | * 9/1997 | |
| WO | WO-2005114148 A2 | * 12/2005 | ........... G01N 21/211 |

OTHER PUBLICATIONS

JP H09246347 A (Jinbo Takeshi) Sep. 19, 1997 [retrieved on aug. 26, 2025]. Retrieved from Foreign Image and Text database, translation by Clarivate Analytics (Year: 1997).*
WIPO, International Search Report and Written Opinion issued in International Application No. PCT/US2025/025503, Jul. 31, 2025.

* cited by examiner

*Primary Examiner* — Edward F Landrum
*Assistant Examiner* — Theodore J Evangelista
(74) *Attorney, Agent, or Firm* — Hodgson Russ LLP

(57) ABSTRACT

The system includes a high vacuum chamber, a bakeout chamber, and an ultra-high vacuum (UHV) chamber that is configured to be removably disposed on the high vacuum chamber and the bakeout chamber. The system further includes a heating element configured to heat the UHV chamber and desorb water vapor from the UHV chamber with the UHV chamber disposed on the bakeout chamber, and a gas source configured to supply a backfill gas to the UHV chamber disposed on the bakeout chamber. The system further includes a bakeout vacuum pump configured to extract the water vapor from the UHV chamber with the UHV chamber disposed on the bakeout chamber, and a high vacuum pump configured to extract the backfill gas from the UHV chamber with the UHV chamber disposed on the high vacuum chamber.

20 Claims, 17 Drawing Sheets

SYSTEMS AND METHODS FOR EX-SITU BAKEOUT OF DIFFERENTIALLY PUMPED VACUUM CHAMBERS

CROSS-REFERENCE TO RELATED APPLICATIONS

This application claims priority to the provisional patent application filed May 3, 2024, and assigned U.S. App. No. 63/642,095, the entire disclosure of which is hereby incorporated by reference.

FIELD OF THE DISCLOSURE

This disclosure relates to bakeout processes for differentially pumped vacuum chambers and, more particularly, to semiconductor inspection systems housed in differentially pumped vacuum chambers.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a workpiece, such as a semiconductor wafer, using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. An arrangement of multiple semiconductor devices fabricated on a single semiconductor wafer may be separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process-induced failures, in some cases, tend to be systematic. That is, process-induced failures tend to fail at predetermined design patterns often repeated many times within the design. Elimination of spatially-systematic, electrically-relevant defects can have an impact on yield.

To minimize environmental factors that can cause defects in the workpiece, manufacturing processes and inspections processes are often performed in controlled environments, such as an enclosed vacuum chamber. For some inspection tools, such as scanning electron microscopes (SEMs), an enclosed vacuum can also prevent an electron beam column from scattering on background gas molecules. Vacuum pressure within the vacuum chamber can be produced using a vacuum pump. A differentially pumped vacuum system consists of at least two vacuum chambers connected by a differential aperture. A differential aperture is a small opening with low conductance. It is typically, but not limited to, a small opening, such as an aperture, orifice, or tube. A differential aperture can be comprised of a single or multiple openings. The differential aperture holds off a pressure differential between the vacuum chambers on either side of the differential aperture. By activating a vacuum pump connected to one of the chambers, the low conductance of the differential aperture allows for a pressure differential to be held between the two vacuum chambers. For example, one vacuum chamber can be held at high vacuum pressure, while the other vacuum chamber is held at ultra-high vacuum pressure.

When vacuum chambers are vented to atmosphere, water adsorbs onto the surface of the vacuum chamber. When pumped down to vacuum, the water vapor begins to slowly desorb. This process of desorption under vacuum is referred to as "outgassing." The outgassing of water can limit achievable vacuum levels. In particular, water outgassing can prevent vacuum systems from reaching the lower range of high vacuum (HV), typically defined as 10-8-104 torr; from reaching ultra-high vacuum (UHV), typically defined as 10-9 torr to 10-12 torr; and extreme ultra high vacuum (XUHV), typically defined as less than 10-12 torr. In order to rapidly remove the water vapor from chamber walls and allow vacuum systems to get into the low HV, UHV, or XUHV pressure ranges, a vacuum bakeout is performed. A vacuum bakeout typically consists of pumping a vacuum system to the HV pressure range and heating the vacuum chamber to allow water vapor to desorb from the vacuum chamber walls and exit the vacuum chamber through the pumping system. The vacuum system does not strictly need to be in high vacuum, however performing a bakeout in the high vacuum pressure range prevents components within the vacuum chamber from oxidizing.

A typical/commonly implemented bakeout process is an in-situ bakeout. The UHV chamber is pumped to high vacuum (HV) and heated, while attached to the remaining vacuum chamber(s) of the differentially pumped system (this process is referred to as a "Vacuum bake" or "vacuum bakeout"). The chamber on the other side of the differentially pumped orifice, aperture, or tube is pumped to vacuum. The remaining chambers of the differentially pumped vacuum system may or may not be heated. Once the UHV chamber reaches bakeout temperature, it is left to bake until sufficient levels of water are desorbed from the chamber walls. UHV pumps are activated and the chamber is pumped to UHV. The UHV chamber is typically isolated from the HV pump(s), either before or after activating the UHV pumps. Isolation of the UHV chamber from the HV pump(s) is typically achieved by closing a valve(s) located between the HV pump(s) and the UHV chamber.

When a UHV chamber bakeout is conducted with the UHV chamber attached to the rest of the vacuum system, there are a few common disadvantages.

The major disadvantage of in-situ bakeout, is that it is lengthy process. Often bakeouts require 24 hours to ramp up to temperature, dwell at bakeout temperature, and ramp down. During this time, the tool in unusable. Bakeout is often the longest process of an SEM column service operation, and thus the rate limiting step in getting a tool back to working after SEM column service.

If only the UHV chamber is heated, the remaining vacuum system acts as a heat sink and removes heat from the UHV chamber. Higher thermal power input is required to reach appropriate bakeout temperature for the UHV chamber. Thermal gradients between the UHV chamber and surrounding vacuum system can cause thermal stress, and even mechanical warpage, of surrounding vacuum system components.

If the entire vacuum system is heated, significantly higher thermal power is required to reach appropriate bakeout temperature. Furthermore, all components attached to the entire vacuum chamber must be either removable during the bakeout or have a high temperature limit compatible with the bakeout.

Electronic devices attached to the outside of the vacuum chamber must be removed for bakeout and replaced after bakeout. This adds significant time and complexity to the bakeout process. If electronic components require precise placement or alignment to components on the vacuum chamber, the alignment/calibration process must be repeated after each bakeout.

Electronic devices mounted inside of the vacuum chamber must be compatible with bakeout temperature. This can be challenging or costly to achieve electronics that have temperature limits compatible with vacuum bakeout profiles.

For precisely mounted components, such as optics elements, heating can cause thermal shift of mechanical during bakeout. Precisely mounted components and aligned optics elements typically must be re-aligned after bakeout.

Another bakeout process is an ex-situ bakeout. The UHV chamber and differential aperture is mechanically separated from the remainder of the differentially pumped vacuum system. The differential orifice, aperture, or tube is sealed, typically by closing an integrated gate valve. A vacuum bakeout is performed on the UHV chamber. UHV pumps are activated and the chamber is pumped to UHV. The UHV chamber is typically isolated from the HV pump(s), either before or after activating the UHV pumps. Isolation of the UHV chamber from the HV pump(s) is typically achieved by closing a valve(s) located between the HV pump(s) and the UHV chamber. After the UHV chamber bakeout is complete, the UHV chamber is reattached to the original vacuum system. The vacuum system is pumped to vacuum. Finally, the seal used to isolate the differential orifice, aperture, or tube is opened, which is typically achieved by opening an isolation valve.

Typical ex-situ bakeout also has its own disadvantages. In order to isolate the UHV chamber's differential orifice, aperture, or tube for UHV pump down and bakeout and also allow the orifice to be opened after the UHV chamber is re-integrated with the remaining vacuum system, often a gate valve must be used as the isolation mechanism. A gate valve provides a good vacuum seal while also allowing for opening using mechanical, electronic, and/or pneumatic actuators.

The problem with this method is that it typically relies on gate valves to seal off the differential orifice, aperture, or tube. First, gate valves are expensive. Second, actuation of the gate valve adds complexity to the vacuum system. Third, gate valves are large in dimension. It is often impossible to add a gate valve between a differential orifice, aperture, or tube that must be aligned within close proximity to another component inside of the vacuum system. Typically 10s of cm of gap is required to allow for sufficient space to integrate a gate valve.

An example of the challenges of integrating a gate valve into a differentially pumped system due to space constraints is in scanning electron microscopes (SEMs). The end of an SEM column must be brought within a few millimeters to centimeters of the sample being imaged. There is typically not enough space to integrate a gate valve between the end of the SEM column and the sample being imaged. Therefore, the gate valve is typically integrated into the middle of the SEM column. The result is that the SEM column must be long in length (typically 10s to 100$s$ of centimeters) with lens elements spaced out far enough to allow for a gate valve to be integrated in between. This method is not compatible with small SEM columns. Traditionally vacuum systems with small SEM columns have relied on in-situ bakeouts.

Due to the problems with existing in-situ and ex-situ bakeout methods described above, an improved vacuum bakeout process is needed.

BRIEF SUMMARY OF THE DISCLOSURE

An embodiment of the present disclosure provides a system. The system may comprise an ultra-high vacuum (UHV) chamber including a differential aperture. The system may further comprise a high vacuum chamber. The UHV chamber may be configured to be removably disposed on the high vacuum chamber, such that the UHV chamber may be in fluid communication with the high vacuum chamber via the differential aperture. The system may further comprise a high vacuum pump configured to produce a high vacuum pressure in the UHV chamber. The system may further comprise a bakeout chamber. The UHV chamber may be further configured to be removably disposed on the bakeout chamber, such that the UHV chamber is in fluid communication with the bakeout chamber via the differential aperture. The system may further comprise a bakeout vacuum pump configured to produce a vacuum pressure in the bakeout chamber and the UHV chamber with the UHV chamber disposed on the bakeout chamber. The system may further comprise a heating element configured to heat the UHV chamber and desorb water vapor from the UHV chamber with the UHV chamber disposed on the bakeout chamber. The bakeout vacuum pump or the high vacuum pump may be further configured to extract the water vapor from the UHV chamber. The system may further comprise a gas source configured to supply a backfill gas to the UHV chamber disposed on the bakeout chamber. The high vacuum pump may be further configured to extract the backfill gas from the UHV chamber with the UHV chamber disposed on the high vacuum chamber.

In some embodiments, the system may further comprise a chuck disposed in the high vacuum chamber. The chuck may be configured to support a workpiece. The system may further comprise an electron source disposed in the UHV chamber. The electron source may be configured to emit an electron beam through the differential aperture directed onto the workpiece.

In some embodiments, the system may further comprise a mechanical hoist configured to remove the UHV chamber from the high vacuum chamber and dispose the UHV chamber on the bakeout chamber. The UHV chamber may be filled with the backfill gas as the mechanical hoist moves the UHV chamber from the bakeout chamber to the high vacuum chamber.

In some embodiments, the system may further comprise a flange cover configured to be removably disposed on the high vacuum chamber and configured to seal the high vacuum chamber as the UHV chamber is removed from the high vacuum chamber.

In some embodiments, the backfill gas may comprise Ar or $N_2$.

In some embodiments, the UHV chamber may further include a bypass valve that is movable between an open position and a closed position. In the open position, the UHV chamber disposed on the high vacuum chamber may be in fluid communication with the high vacuum chamber via the bypass valve and the UHV chamber disposed on the bakeout chamber may be in fluid communication with the bakeout chamber via the bypass valve.

In some embodiments, the system may further comprise a UHV pump configured to produce a UHV pressure in the UHV chamber with the bypass valve in the closed position.

In some embodiments, the gas source may be configured supply the backfill gas to the UHV chamber via the bakeout chamber through the bypass valve in the open position.

In some embodiments, the gas source may be configured to supply the backfill gas directly to the UHV chamber.

In some embodiments, the heating element may be a conductive heating element disposed within the bakeout chamber.

In some embodiments, the heating element may be a radiant heating element disposed within the bakeout chamber.

Another embodiment of the present disclosure provides a method. The method may comprise pumping, with a vacuum bakeout pump, a bakeout chamber and a ultra-high vacuum (UHV) chamber to a vacuum pressure. The UHV chamber may include a differential aperture, and the UHV chamber may be in fluid communication with the bakeout chamber via the differential aperture as the UHV chamber is removably disposed on the bakeout chamber. The method may further comprise heating, with a heating element, the UHV chamber to desorb water vapor from the UHV chamber. The method may further comprise extracting, with the vacuum bakeout pump, the water vapor from the UHV chamber. The method may further comprise supplying, with a gas source, a backfill gas to the UHV chamber.

In some embodiments, before pumping the bakeout chamber and the UHV chamber to the vacuum pressure, the method may further comprise removing, with a mechanical hoist, the UHV chamber from a high vacuum chamber. The UHV chamber may be in fluid communication with the high vacuum chamber via the differential aperture as the UHV chamber is removably disposed on the high vacuum chamber. The method may further comprise disposing, with the mechanical hoist, the UHV chamber onto the bakeout chamber.

In some embodiments, after supplying the backfill gas to the UHV chamber, the method may further comprise removing, with the mechanical hoist, the UHV chamber from the bakeout chamber. The method may further comprise disposing, with the mechanical hoist, the UHV chamber onto the high vacuum chamber.

In some embodiments, after disposing the UHV chamber onto the high vacuum chamber, the method may further comprise extracting, with a high vacuum pump, the backfill gas from the UHV chamber.

In some embodiments, after extracting the backfill gas from the UHV chamber, the method may further comprise pumping, with a UHV pump, the UHV chamber to a UHV pressure.

In some embodiments, the method may further comprise disposing a flange cover on the high vacuum chamber to seal the high vacuum chamber after the UHV chamber is removed from the high vacuum chamber.

In some embodiments, before disposing the UHV chamber onto the high vacuum chamber, the method may further comprise removing the flange cover from the high vacuum chamber.

In some embodiments, the UHV chamber may further include a bypass valve that is movable between an open position and a closed position, the UHV chamber may be in fluid communication with the bakeout chamber via the bypass valve in the open position as the UHV chamber is removably disposed on the bakeout chamber, and after supplying the backfill gas to the UHV chamber, the method may further comprise moving the bypass valve to the closed position to seal the backfill gas within the UHV chamber.

In some embodiments, the backfill gas may comprise Ar or $N_2$.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

An embodiment of the present disclosure provides a system 100. The system 100 may be a differentially pumped vacuum system including at least two vacuum chambers connected by a differential aperture. The differential aperture may be a small opening with low conductance. It typically, but limited to, a small opening, such as an aperture, orifice, or tube. The differential aperture can be comprised of a single or multiple openings. The differential aperture may hold off a pressure differential between the vacuum chambers on either side of the differential aperture.

Figure 1:
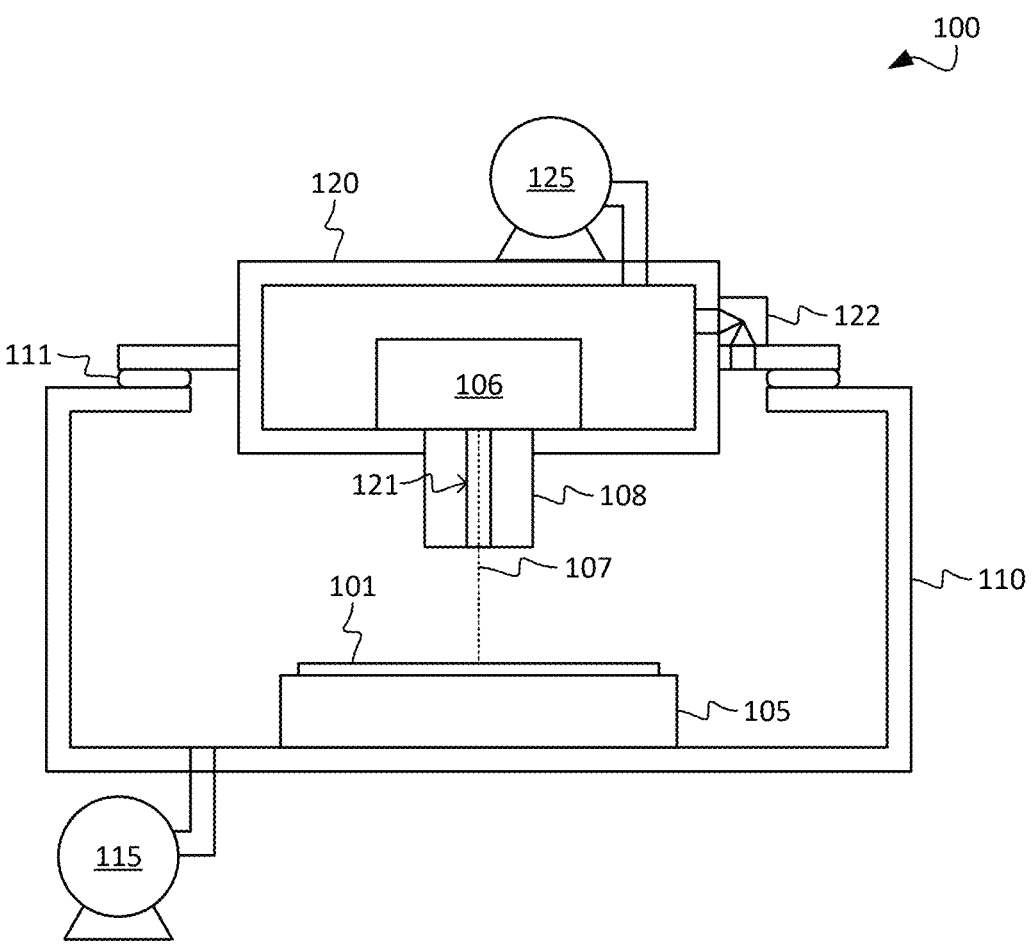
FIG. 1 is a diagram of a system according to an embodiment of the present disclosure, in which an ultra-high vacuum (UHV) chamber is disposed on a high vacuum chamber.

Referring to FIG. 1, the at least two vacuum chambers of the system 100 may comprise a high vacuum chamber 110 and an ultra-high vacuum (UHV) chamber 120. While the high vacuum chamber 110 and the UHV chamber 120 are described as being "high vacuum" and "ultra-high vacuum" respectively, it should be understood that these terms are merely used to differentiate these two vacuum chambers, with either chamber being configured to operate at "high vacuum," "ultra-high vacuum," or other pressures and is not limited herein.

The UHV chamber 120 may be removably disposed on the high vacuum chamber 110. For example, the high vacuum chamber 110 may include a vacuum seal 111 configured to seal the UHV chamber 120 to the high vacuum chamber 110. The UHV chamber 120 may include a differential aperture 121 that connects the UHV chamber 120 to the high vacuum chamber 110. Accordingly, the high vacuum chamber 110 may be in fluid communication with the UHV chamber 120 via the differential aperture 121.

In the embodiment shown in FIG. 1, the system 100 further comprises a chuck 105 disposed in the high vacuum chamber 110. The chuck 105 may be configured to support a workpiece 101. The workpiece 101 may be a semiconductor wafer, substrate, printed circuit board (PCB), integrated circuit (IC), flat panel display (FPD) or other type of workpiece. The system 100 may further comprise a scanning electron microscope (SEM) disposed in the UHV chamber 120. The SEM may include an electron source 106 configured to emit and electron beam 107 through the differential aperture 121 directed onto the workpiece 101. A beam column 108 may be configured to direct the electron beam 107 onto the workpiece 101. The chuck 105 may be disposed on a stage configured to move the workpiece 101 relative to the electron beam 107 (i.e., in one or more in-plane or out-of-plane directions) to direct the electron beam 107 onto different parts of the workpiece 101. The system 100 may include other elements disposed in the UHV chamber 120, such as, for example, ion sources, measurement heads (e.g., scanning tunnel microscopy (STM) heads), spectrometers, or other components. The system 100 may further include other elements connected to the high vacuum chamber 110 and/or the UHV chamber 120, such as, for example, pressure gauges, overpressure valves, wafer load locks, vacuum flanges and feedthroughs, optical view ports, gas vent valves, gas purge lines, or other components.

The UHV chamber 120 may further include a bypass valve 122 that connects the UHV chamber 120 to the high vacuum chamber 110. The bypass valve 122 may be movable between an open position and a closed position. In the open position, the high vacuum chamber 110 may be in fluid communication with the UHV chamber 120 via the bypass valve 122, while in the closed position, the high vacuum chamber 110 may be sealed from the UHV chamber 120 by the bypass valve 122. The bypass valve 122 may be controlled to move between the open position and the closed position by manual or automated means.

The system 100 may further comprise a high vacuum pump 115. The high vacuum pump 115 may be connected to the high vacuum chamber 110. The high vacuum pump 115 may be configured to produce a high vacuum pressure in the high vacuum chamber 110 and the UHV chamber 120 with the bypass valve 122 in the open position. The system 100 may further comprise a UHV pump 125. The UHV pump 125 may be a non-evaporable getter (NEG) pump, ion pump, or a combination of both. However, other types of UHV pumps can be used. The UHV pump 125 may be connected to the UHV chamber 120. The UHV pump 125 may be configured to produce a UHV pressure in the UHV chamber 120 with the bypass valve 122 in the closed position. In some embodiments, the system 100 may comprise both the high vacuum pump 115 and the UHV pump 125. Alternatively, the system 100 may comprise only one of the high vacuum pump 115 or the UHV pump 125, which may be configured to differentially pump both the high vacuum chamber 110 and the UHV chamber 120 via the differential aperture 121. The high vacuum pump 115 and the UHV pump 125 may be operable by valves (not shown) by manual or automated means.

Figure 2:
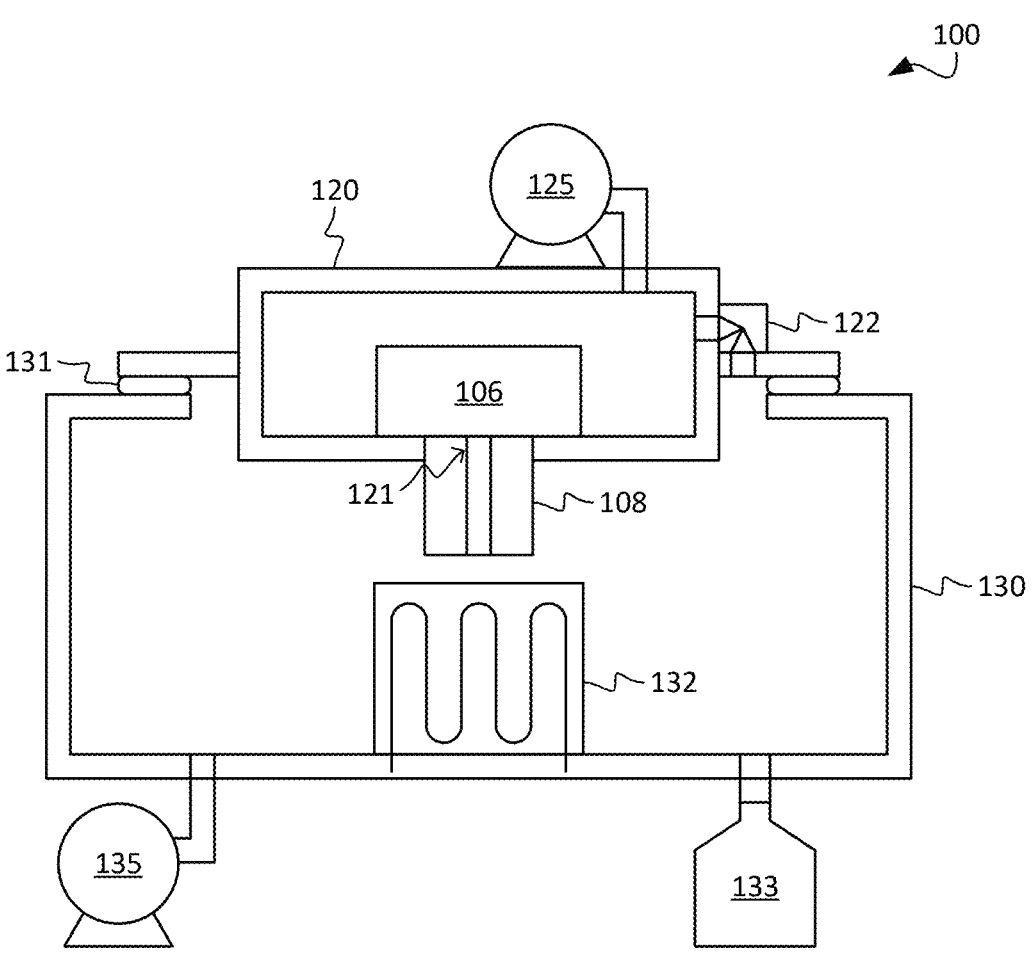
FIG. 2 is a diagram of the system of FIG. 1, in which the UHV chamber is disposed on a bakeout chamber.

The system 100 may be configured to perform ex-situ bakeout of the UHV chamber 120. For example, the UHV chamber 120 may be removable from the high vacuum chamber 110 and disposed on a bakeout chamber 130, as shown in FIG. 2. The bakeout chamber 130 may include a vacuum seal 131 connecting the UHV chamber 120 to the bakeout chamber 130. The bakeout chamber 130 may be in fluid communication with the UHV chamber 120 via the differential aperture 121. The bakeout chamber 130 may also be in fluid communication with the UHV chamber 120 via the bypass valve 122 in the open position, and sealed from the UHV chamber 120 with bypass valve 122 in the closed position. The system 100 may further include other elements connected to the bakeout chamber 130, such as, for example, pressure gauges, overpressure valves, wafer load locks, vacuum flanges and feedthroughs, optical view ports, gas vent valves, gas purge lines, or other components.

The system 100 may further comprise a bakeout vacuum pump 135. The bakeout vacuum pump 135 may be connected to the bakeout chamber 130. The bakeout vacuum pump 135 may be configured to produce a vacuum pressure in the bakeout chamber 130 and the UHV chamber 120 via the differential aperture 121 and the bypass valve 122 in the open position. The bakeout vacuum pump 135 may be, for example, a turbo molecular pump. The bakeout vacuum pump 135 may be operable by a valve (not shown) by manual or automated means.

The system 100 may further comprise a heating element 132. The heating element 132 may be configured to heat the UHV chamber 120 disposed on the bakeout chamber 130 and desorb water vapor from the UHV chamber 120 with the UHV chamber 120 disposed on the bakeout chamber 130. The heating element 132 may be a conductive heating element disposed inside or outside of the bakeout chamber 130. Conductive heating elements may include, for example, metal or ceramic heaters, cartridge heaters, heater tapes, or heater jackets. These conductive heating elements may operate based on joule heating, which generates heat by sending a current through a metal wire. Alternatively, the heating element 132 may be a radiant heating element disposed inside or outside of the bakeout chamber 130. Radiant heating elements may include, for example, a hot filament or a halogen bulb. As a further alternative, the heating element 132 may be a convective heating element disposed inside or outside of the bakeout chamber 130.

Convective heating elements may include, for example, a forced hot air source. The heating element 132 may be configured to heat the UHV chamber 120 to a temperature of preferably, but not limited to, greater than 100° C. to desorb the water vapor from the UHV chamber 120. The heating element 132 may be used in conjunction with a power supply, temperature controller, and temperature sensor to regulate the heating of the UHV chamber 120. Although the heating element 132 is illustrated (e.g., in FIG. 2) as being connected to the bakeout chamber 130, in some embodiments, the heating element 132 may be connected to the UHV chamber 120 or to both the UHV chamber 120 and the bakeout chamber 130 in order to heat the UHV chamber 120 or both the UHV chamber 120 and the bakeout chamber 130. The bakeout vacuum pump 135 may be further configured to extract the water vapor from the UHV chamber 120.

The system 100 may further comprise a gas source 133. The gas source 133 may be configured to supply a backfill gas to the UHV chamber 120 disposed on the bakeout chamber 130. The backfill gas may comprise Ar, $N_2$, $H_2$, or other dry gasses, such as, for example, inert gasses. In some embodiments, the backfill gas may comprise a mixture of dry gasses (e.g., $Ar/N_2$, $Ar/H_2$, or other mixtures). In some embodiments, the gas source may be configured supply the backfill gas to the UHV chamber 120 via the bakeout chamber 130 through the bypass valve 122 in the open position. For example, the gas source 133 may be connected to the bakeout chamber 130, as shown in FIG. 2. Alternatively, the gas source 133 may be configured to supply the backfill gas directly to the UHV chamber 120. For example, the gas source 133 may be connected directly to the UHV chamber 120, without first going through the bakeout chamber 130. In some embodiments, the gas source 133 may be directly connected to both the UHV chamber 120 and the bakeout chamber 130 (or the system 100 may include two gas sources 133) to supply both chambers without passing through the bypass valve 122. The supply of the backfill gas from the gas source 133 may be controlled by a valve (not shown) by manual or automated means.

Figure 3A:
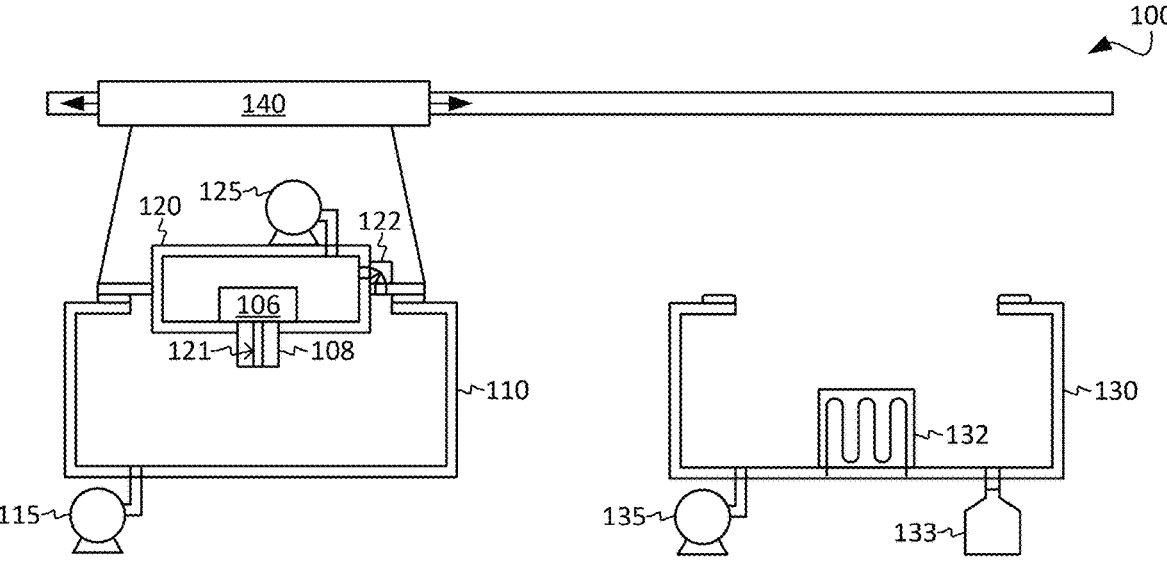
FIGS. 3A to 3C illustrate an exemplary process of moving the UHV chamber between the high vacuum chamber and the bakeout chamber using a mechanical hoist.
Figure 3B:
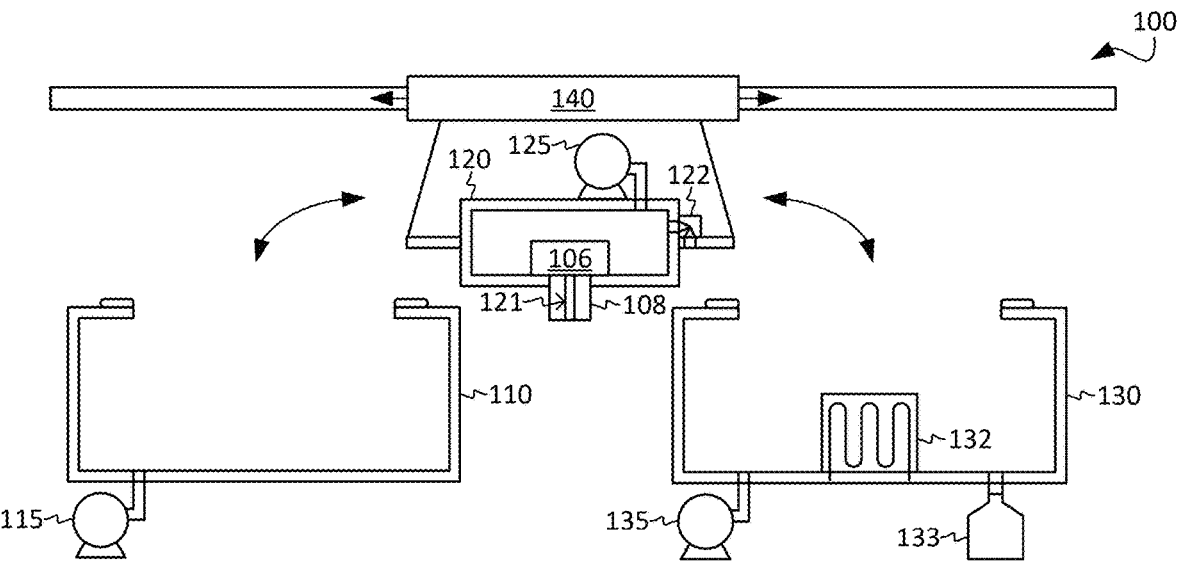
Figure 3C:
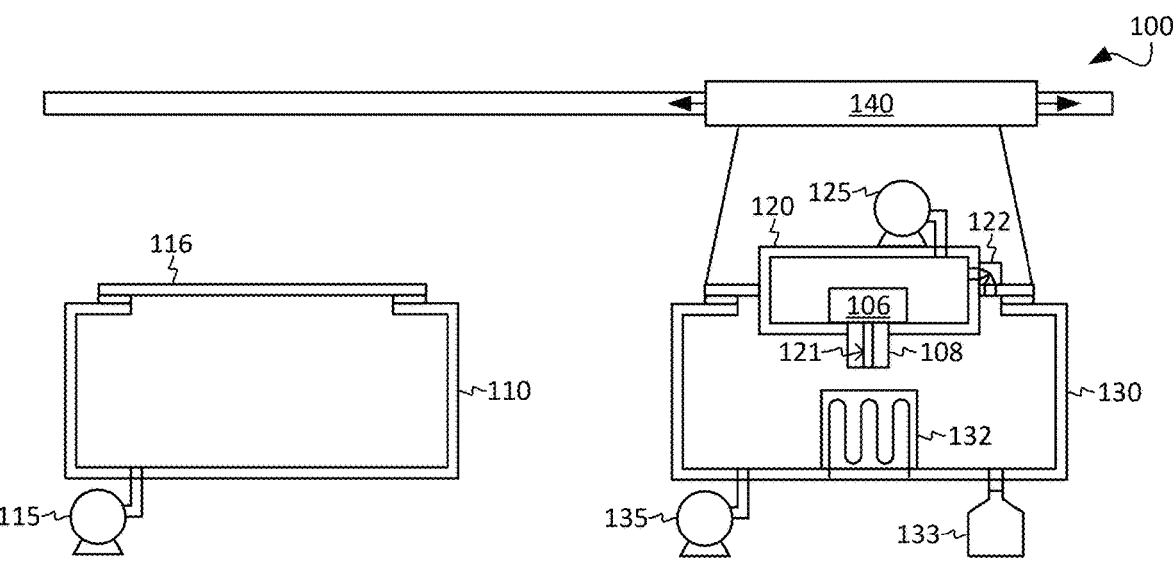

The system 100 may further comprise a mechanical hoist 140, as shown in FIGS. 3A to 3C. The mechanical hoist 140 may be configured to move the UHV chamber 120 from being disposed on the high vacuum chamber 110 (as shown in FIG. 3A) to being disposed on the bakeout chamber 130 (as shown in FIG. 3C). In the illustrated example, the mechanical hoist 140 includes a tether configured to lift the UHV chamber 120 and move the UHV chamber 120 between the high vacuum chamber 110 and the bakeout chamber 130, as shown in FIG. 3B. In some embodiments, the mechanical hoist 140 may include other elements, such as, for example a crane (gantry/jib), electric or hydraulic lifts, linear motors or actuators, or a fork lift. Alternatively, the UHV chamber 120 can be moved between the high vacuum chamber 110 and the bakeout chamber 130 by manual lifting (i.e., without the use of the mechanical hoist 140). The process of moving the UHV chamber 120 from the high vacuum chamber 110 to the bakeout chamber 130 is illustrated in sequence from FIG. 3A to FIG. 3B to FIG. 3C. Similarly, a process of moving the UHV chamber 120 from the bakeout chamber 130 to the high vacuum chamber 110 is illustrated in sequence from FIG. 3C to FIG. 3B to FIG. 3A.

The system 100 may further comprise a flange cover 116. As shown in FIG. 3C, the flange cover 116 may be removably disposed on the high vacuum chamber 110. The flange cover 116 may be configured to seal the high vacuum chamber 110 as the UHV chamber 120 is removed from the high vacuum chamber 110. Accordingly, external contaminants can be prevented from entering the high vacuum chamber 110 and contaminating the workpiece 101 or the components within the high vacuum chamber 110.

The system 100 may further comprise a processor. The processor may include a microprocessor, a microcontroller, or other devices. The processor may be coupled to the components of the system 100 in any suitable manner (e.g., via one or more transmission media, which may include wired and/or wireless transmission media) such that the processor can receive output. The processor may be configured to perform a number of functions using the output. An inspection tool can receive instructions or other information from the processor. The processor optionally may be in electronic communication with another inspection tool, a metrology tool, a repair tool, or a review tool (not illustrated) to receive additional information or send instructions.

The processor may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor may be disposed in or otherwise part of the system 100 or another device. In an example, the processor may be part of a standalone control unit or in a centralized quality control unit. Multiple processors may be used, defining multiple subsystems of the system 100.

The processor may be implemented in practice by any combination of hardware, software, and firmware. Also, its functions as described herein may be performed by one unit, or divided up among different components, each of which may be implemented in turn by any combination of hardware, software and firmware. Program code or instructions for the processor 150 to implement various methods and functions may be stored in readable storage media, such as a memory.

If the system 100 includes more than one subsystem, then the different processors may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor may be configured to perform a number of functions using the output of the system 100 or other output. For instance, the processor may be configured to send the output to an electronic data storage unit or another storage medium. The processor may be further configured as described herein.

The processor may be configured according to any of the embodiments described herein. The processor also may be configured to perform other functions or additional steps using the output of the system 100 or using images or data from other sources.

The processor may be communicatively coupled to any of the various components or sub-systems of system 100 in any manner known in the art. Moreover, the processor may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the processor and other subsystems of the system 100 or systems external to system 100. Various steps, functions, and/or operations of system 100 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random-access memory, a magnetic or optical disk, a non-volatile memory, a solid-state memory, a magnetic tape, and the like. A carrier medium may include a transmission medium such as a wire, cable, or wireless transmission link. For instance, the various steps described throughout the present disclosure may be carried out by a single processor (or computer subsystem) or, alternatively, multiple processors (or multiple computer subsystems). Moreover, different sub-systems of the system 100 may include one or more computing or logic systems. Therefore, the above description should not be interpreted as a limitation on the present disclosure but merely an illustration.

The processor may be in electronic communication with the bypass valve 122. For example, the processor may be configured to send signals to the bypass valve 122 to move between the open position and the closed position. The processor may be in electronic communication with the valves of the high vacuum pump 115, the UHV pump 125, and the bakeout vacuum pump 135. For example, the processor may be configured to send signals to the respective valves to control the high vacuum pump 115, the UHV pump 125, and the bakeout vacuum pump 135 to produce a vacuum pressure in their connected vacuum chambers and extract water vapor and/or backfill gas from their connected chambers. The processor may be in electronic communication with the heating element 132. For example, the processor may be configured to send signals to the heating element 132 to heat the UHV chamber 120 disposed on the bakeout chamber 130. The processor may be in electronic communication with a valve of the gas source 133. For example, the processor may be configured to send signals to the valve of the gas source 133 to supply the backfill gas to the bakeout chamber 130 and/or the UHV chamber 120. The processor may be in electronic communication with the mechanical hoist 140. For example, the processor may be configured to send signals to one or more motors or actuators of the mechanical hoist 140 to engage the UHV chamber 120 and move the UHV chamber between the high vacuum chamber 110 and the bakeout chamber 130.

While the processor can be used to automate various functions of the elements of the system 100, in some embodiments, these functions can be performed by manual operation of valves and switches to control the elements of the system 100 described above.

Referring to FIGS. 4A to 4E, an exemplary ex-situ bakeout process may be performed with the system 100.

Figure 4A:
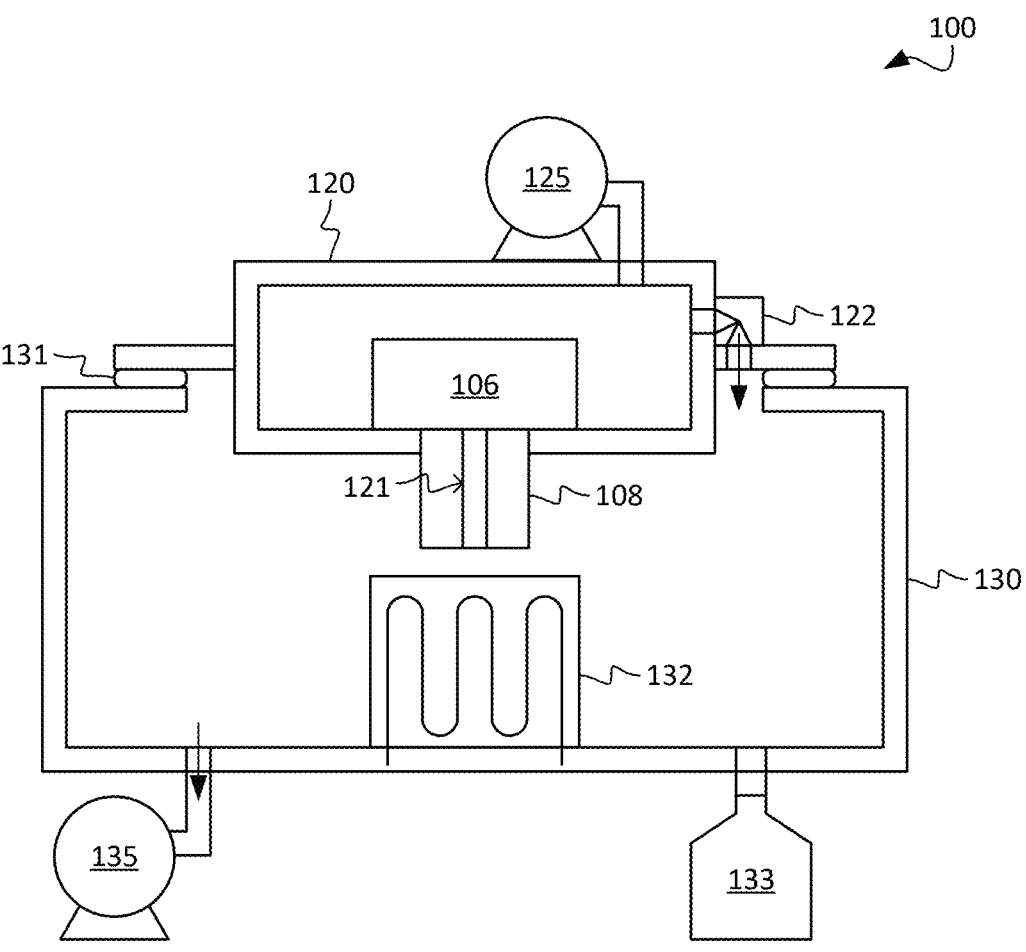
FIGS. 4A to 4E illustrate a process of performing vacuum bakeout of the UHV chamber according to an embodiment of the present disclosure.

In a first step shown in FIG. 4A, the UHV chamber 120 and the bakeout chamber 130 are pumped down. This can be accomplished by opening the bypass valve 122 between the UHV chamber 120 and the bakeout chamber 130. The bakeout vacuum pump 135 may be used to pump down both the bakeout chamber 130 and the UHV chamber 120. In this configuration, the UHV chamber 120 is pumped down through the bypass valve 122 connecting UHV chamber 120 and bakeout chamber 130. In an alternative configuration, the UHV pump 125 may be used to pump down the UHV chamber 120 and the bakeout chamber 130 through the bypass valve 122.

Figure 4B:
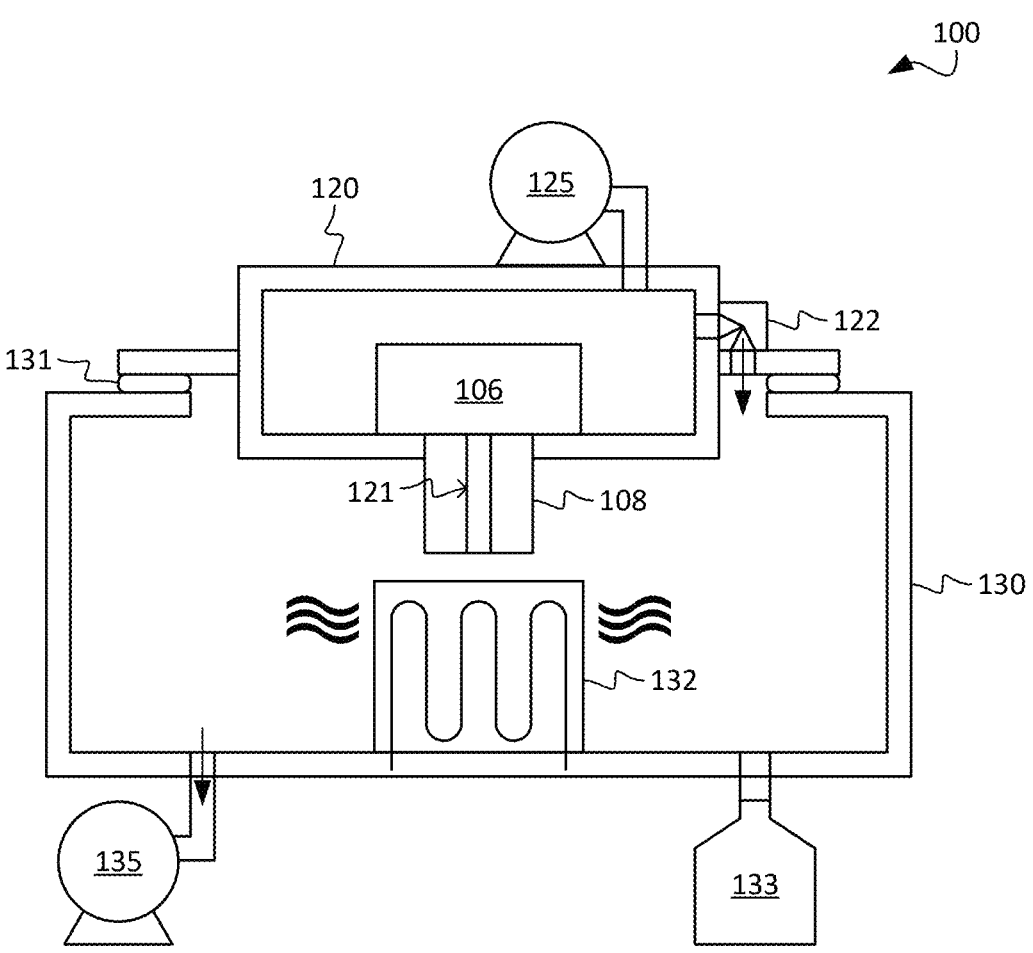

Once both the UHV chamber 120 and the bakeout chamber 130 are pumped to vacuum, the UHV vacuum chamber 120 is heated with the heating element 132 to thermally desorb water from the internal walls of UHV chamber 120, as shown in FIG. 4B. In some embodiments, the heating element 132 may also heat the walls of the bakeout chamber 130 to desorb water from the internal walls of the bakeout chamber 130. This process is referred to as vacuum bakeout. The vacuum bakeout is preferably conducted at temperatures greater than 100° C. Temperatures less than 100° C. can be used, but the rate of water desorption may be lower.

After vacuum bakeout is complete, the UHV pump 125 may be activated to reduce the pressure in UHV chamber 120 to below what can be achieved by bakeout vacuum pump 135. Either before or after the activation of the UHV pump 125, the bypass valve 122 can be moved to the closed position to isolate the UHV chamber 120 from bakeout chamber 130. The vacuum conduction pathway remaining between UHV chamber 120 and bakeout chamber 130 may be the differential aperture 121. Alternatively, the UHV pump 125 may not be activated, and only the bakeout vacuum pump 135 is used to pump out the UHV chamber 120 and desorb water from its internal surface.

Figure 4C:
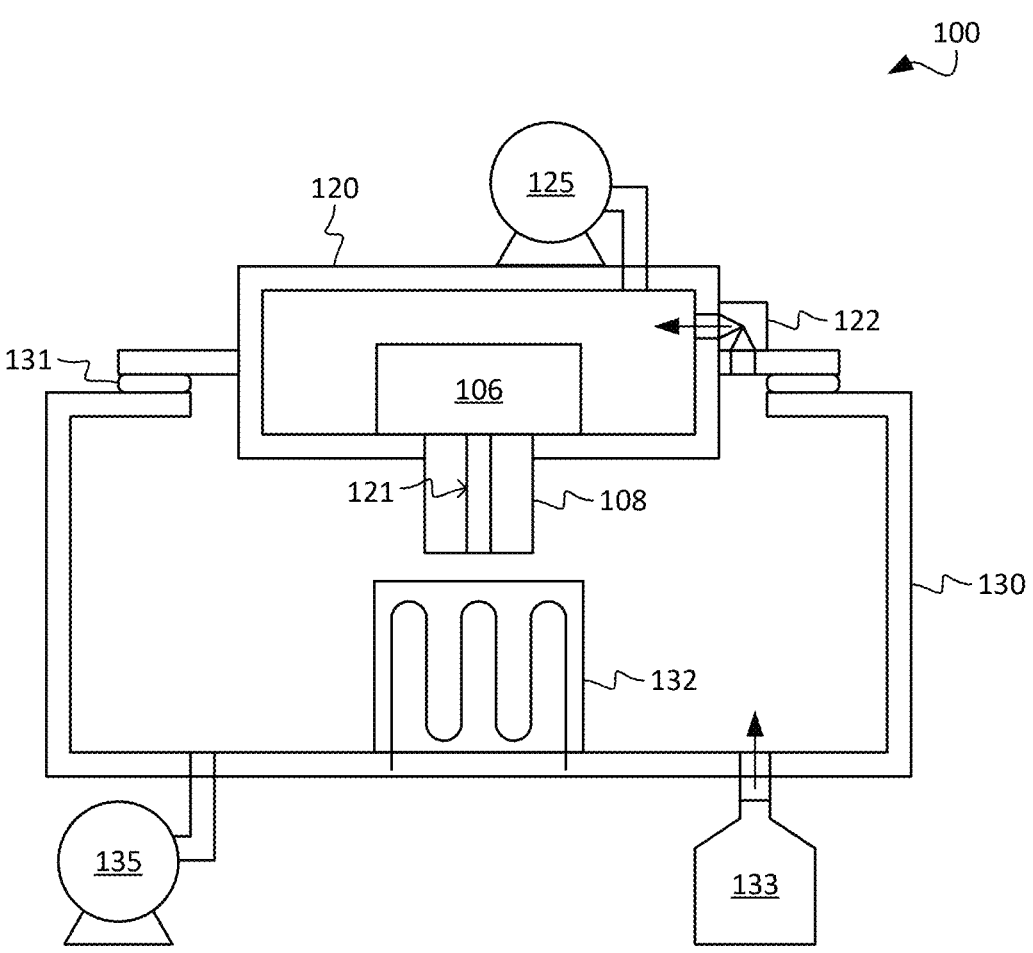

After the UHV chamber 120 is fully baked out, the next step is to backfill the UHV chamber 120 with a dry gas from the gas source 133, as shown in FIG. 4C. If NEG pumps are used, Ar may be used as the backfill gas, as Ar does not chemisorb to the NEG element, and can easily be pumped out and removed from UHV chamber 120 at a later point. However, other dry gases, such as $N_2$, can also be used. In such cases, the pumps are heated in a process called "conditioning" to drive off any physiosorbed molecules (including water), which is then removed from the vacuum system through the HV turbopump. The NEGs can be further heated in a process called "activation" in which chemisorbed molecules on the NEG are driven into the bulk of the NEG material, leaving a clean pumping surface. Ion pumps can also be activated to remove any adsorbed species on the electrodes of the ion pump. The backfill gas may be supplied to the bakeout chamber 130, and with the bypass valve 122 in the open position, the backfill gas may be supplied to the UHV chamber 120. Alternatively, the backfill gas may be directly supplied to the UHV chamber 120. The backfill gas may be allowed to fill the UHV chamber 120 to atmospheric pressure or to a pressure greater than atmospheric pressure. Once the UHV chamber 120 is filled with the backfill gas, the bypass valve 122 may be moved to the closed position to seal the backfill gas within the UHV chamber 120.

Because the UHV chamber 120 is filled with the backfill gas to either atmospheric or a positive pressure, there is no pressure gradient to drive outside air (with water humidity) into UHV chamber 120 through the differential aperture 121. Furthermore, because the differential aperture 121 has such low conductance, there may be very small amounts of gas exchange between the inside and outside of UHV chamber 120 through the differential aperture 121 by diffusion of gas molecules. The UHV chamber 120 may therefore remained filled predominantly with the backfill gas for an extended period of time, without the need for the differential aperture 121 to be sealed with a mechanical method, such as a gate valve. The UHV chamber 120 may stay dry without significant levels of water vapor entering that would impact future vacuum levels or warrant the need for an additional, in situ bakeout at a future time.

Figure 4D:
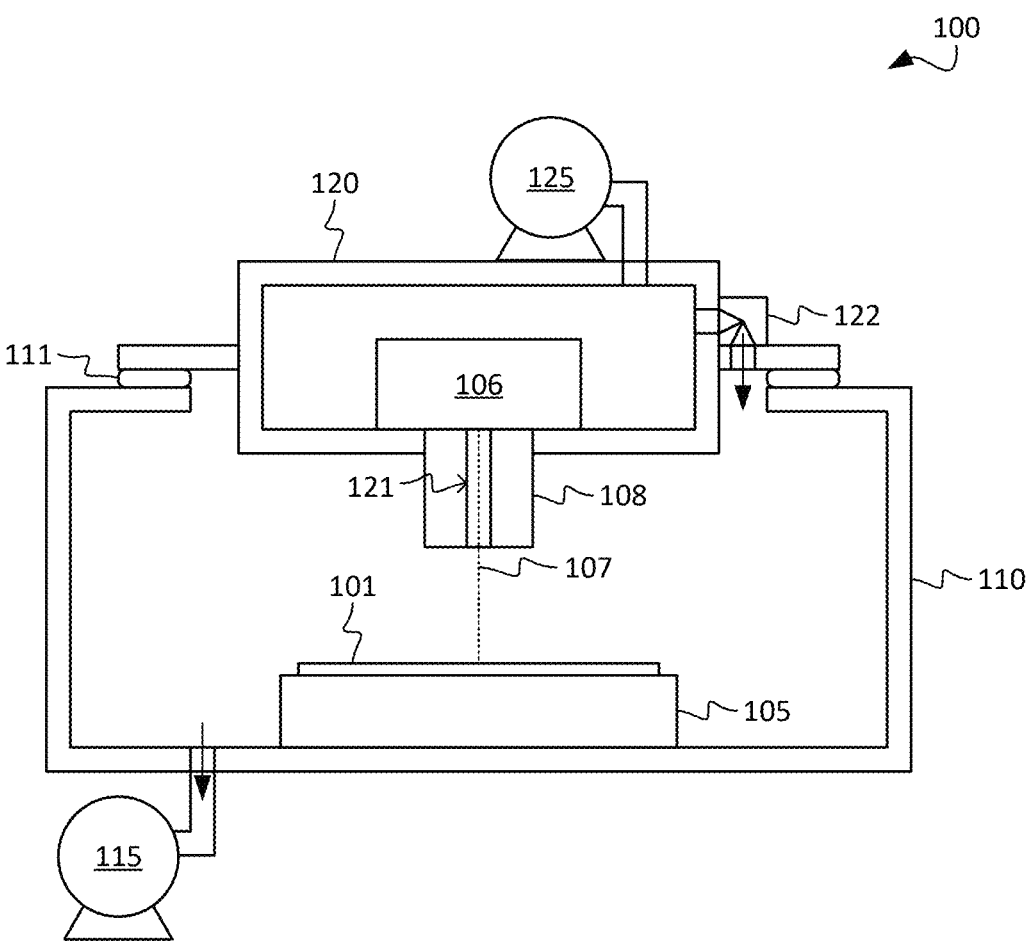

The UHV chamber 120 can then be reattached to the high vacuum chamber 110, as shown in FIG. 4D. The backfill gas in the UHV chamber 120 may allow the UHV chamber 120 to remain clean as it is transported from the bakeout chamber 130 to the high vacuum chamber 110 (e.g., by the mechanical hoist 140 in FIGS. 3C to 3A). After the UHV chamber 120 is reattached to the high vacuum chamber 110, the high vacuum chamber 110 and the UHV chamber 120 may pumped down to base pressure using the high vacuum pump 115, with the bypass valve 122 being in the open position. The high vacuum pump 115 may be configured to extract the backfill gas from the UHV chamber 120 with the UHV chamber 120 disposed on the high vacuum chamber 110.

Figure 4E:
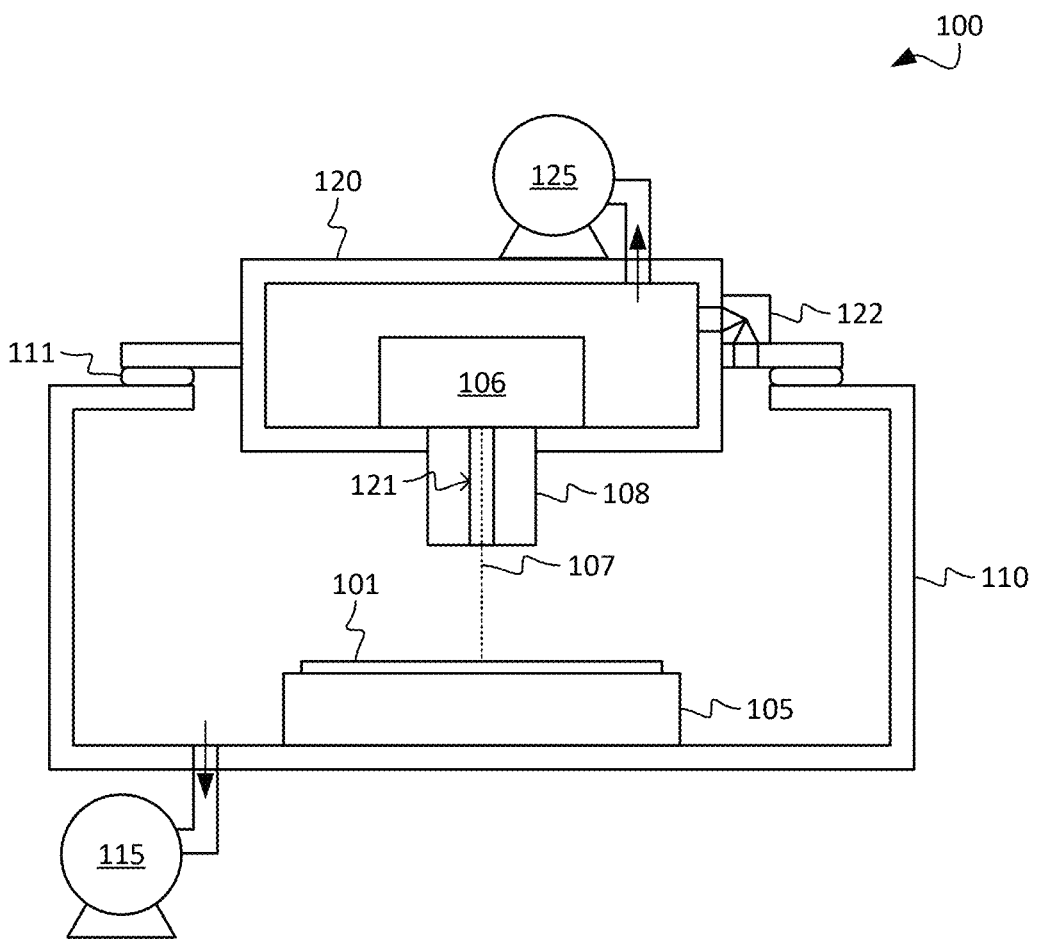

Once base vacuum level is reached, the UHV pump 125 can be activated to further reduce the pressure in the UHV chamber 120, as shown in FIG. 4E. Accordingly, UHV or XUHV pressures can be achieved in the UHV chamber 120. Either before or after the UHV pump 125, the bypass valve 122 may be closed to isolate the UHV chamber 120 from high vacuum chamber 110. Because the backfill gas provided in the UHV chamber 120 prevents the inflow of humid air after ex situ bakeout and during chamber transfer, there may be no need to perform an in-situ bakeout after the UHV chamber 120 is installed on the high vacuum chamber 110.

In some embodiments, the UHV chamber 120 may not include a bypass valve 122, and may instead include a second high vacuum pump 126 directly connected to the UHV chamber 120. Referring to FIGS. 5A to 5E, an exemplary ex-situ bakeout process may be performed with the system 100, without operation of a bypass valve 122.

Figure 5A:
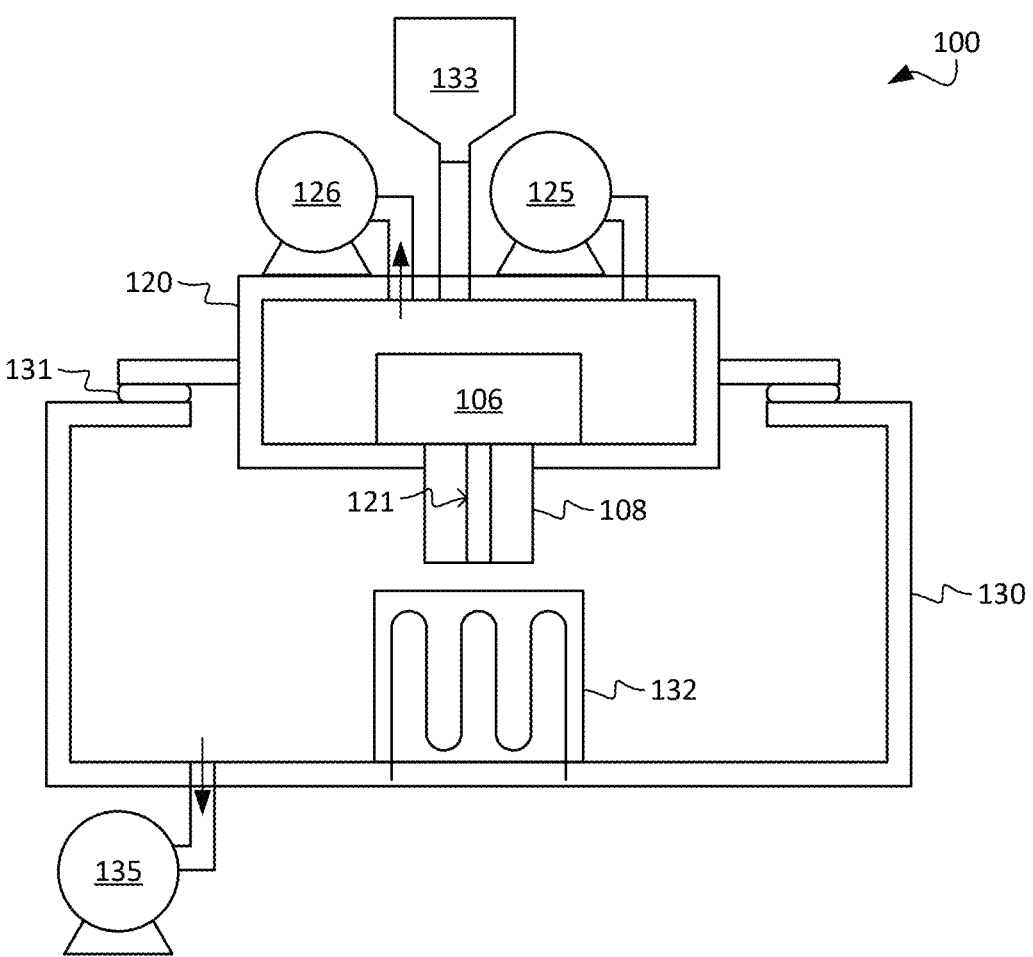
FIGS. 5A to 5E illustrate a processor of performing vacuum backout of a UHV chamber according to another embodiment of the present disclosure.

In a first step shown in FIG. 5A, the UHV chamber 120 and the bakeout chamber 130 are pumped down. The bakeout vacuum pump 135 may be used to pump down the bakeout chamber 130, and the second high vacuum pump 126 may be used to pump down the UHV chamber 120.

Figure 5B:
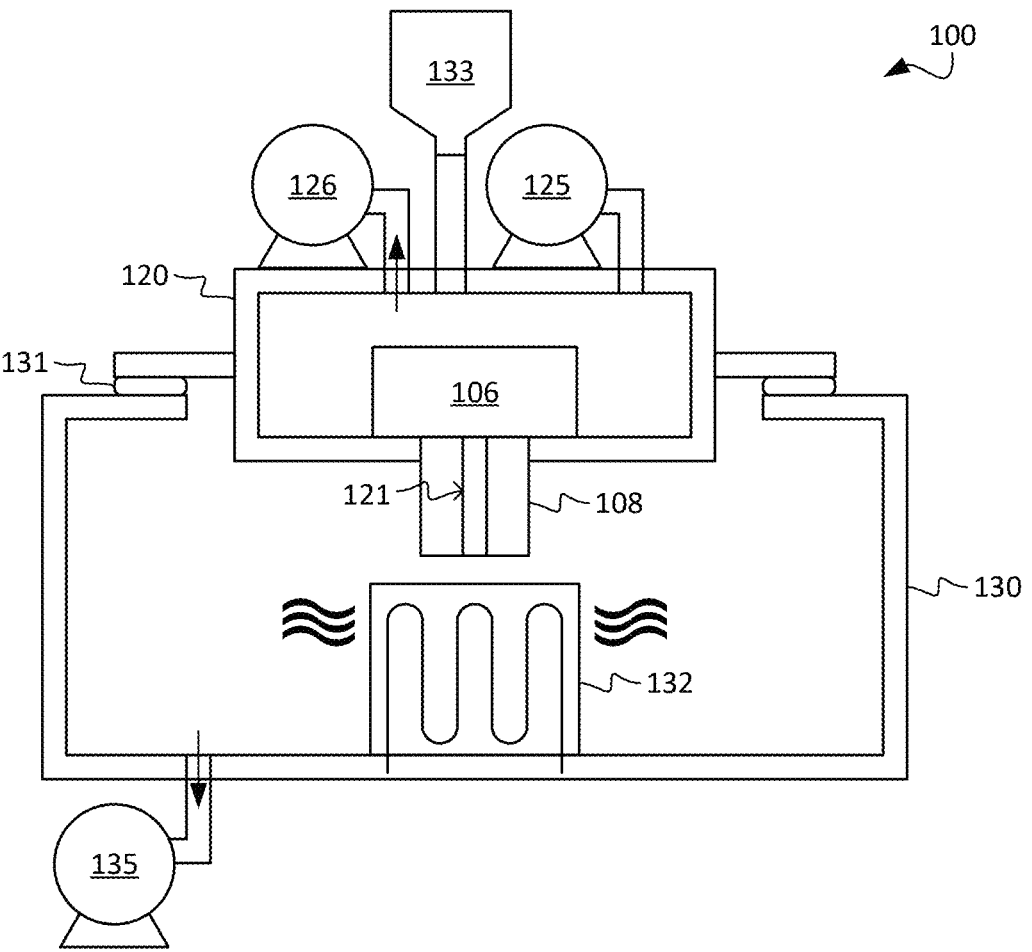

Once both the UHV chamber 120 and the bakeout chamber 130 are pumped to vacuum, the UHV vacuum chamber 120 is heated with the heating element 132 to thermally desorb water from the internal walls of UHV chamber 120, as shown in FIG. 5B. In some embodiments, the heating element 132 may also heat the walls of the bakeout chamber 130 to desorb water from the internal walls of the bakeout chamber 130. This process is referred to as vacuum bakeout. The vacuum bakeout is preferably conducted at temperatures greater than 100° C. Temperatures less than 100° C. can be used, but the rate of water desorption may be lower.

After vacuum bakeout is complete, the UHV pump 125 may be activated to reduce the pressure in UHV chamber 120 to below what can be achieved by bakeout vacuum pump 135. Before activation of the UHV pump 125, the second high vacuum pump 126 may be turned off. Alternatively, the UHV pump 125 may not be activated, and the second high vacuum pump 126 is used to pump out the UHV chamber 120 and desorb water from its internal surface.

Figure 5C:
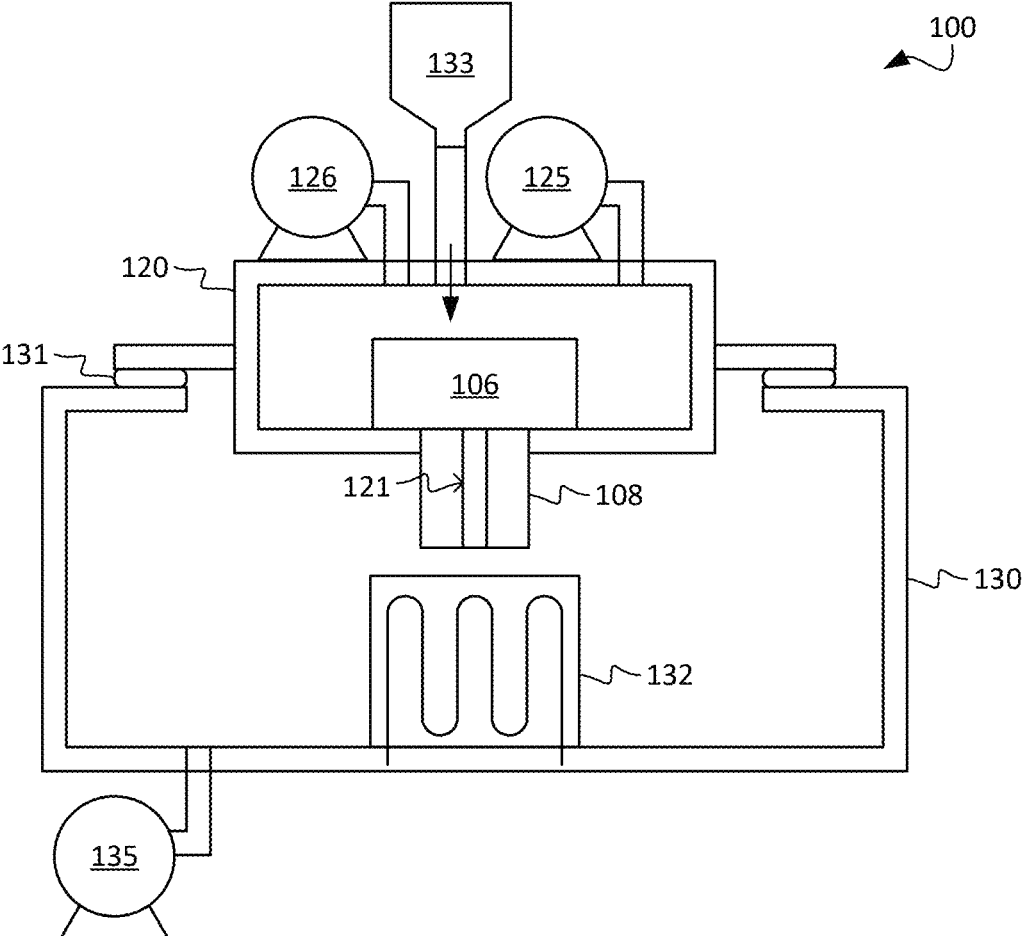

After the UHV chamber 120 is fully baked out, the next step is to backfill the UHV chamber 120 with a dry gas from the gas source 133, as shown in FIG. 5C. If NEG pumps are used, Ar may be used as the backfill gas, as Ar does not chemisorb to the NEG element, and can easily be pumped out and removed from UHV chamber 120 at a later point. However, other dry gases, such as $N_2$, can also be used. In such cases, the pumps are heated in a process called "conditioning" to drive off any physiosorbed molecules (including water), which is then removed from the vacuum system through the HV turbopump. The NEGs can be further heated in a process called "activation" in which chemisorbed molecules on the NEG are driven into the bulk of the NEG material, leaving a clean pumping surface. Ion pumps can also be activated to remove any adsorbed species on the electrodes of the ion pump. The backfill gas may be directly supplied to the UHV chamber 120, with the gas source 133 being directly connected to the UHV chamber 120. The backfill gas may be allowed to fill the UHV chamber 120 to atmospheric pressure or to a pressure greater than atmospheric pressure. In some embodiments, the backfill gas can also be supplied to the bakeout chamber 130 via the same gas source 133 or a separate gas source.

Because the UHV chamber 120 is filled with the backfill gas to either atmospheric or a positive pressure, there is no pressure gradient to drive outside air (with water humidity) into UHV chamber 120 through the differential aperture 121. Furthermore, because the differential aperture 121 has such low conductance, there may be very small amounts of gas exchange between the inside and outside of UHV chamber 120 through the differential aperture 121 by diffusion of gas molecules. The UHV chamber 120 may therefore remained filled predominantly with the backfill gas for an extended period of time, without the need for the differential aperture 121 to be sealed with a mechanical method, such as a gate valve. The UHV chamber 120 may stay dry without significant levels of water vapor entering that would impact future vacuum levels or warrant the need for an additional, in situ bakeout at a future time.

Figure 5D:
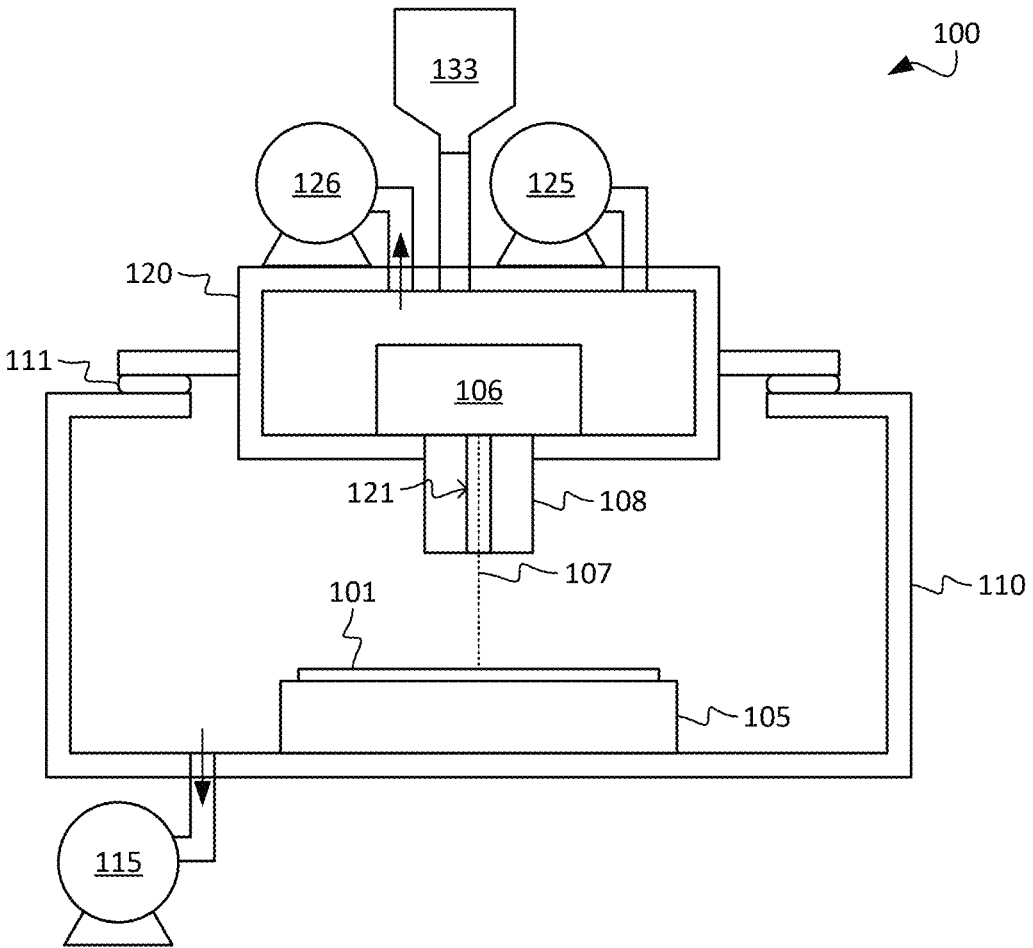

The UHV chamber 120 can then be reattached to the high vacuum chamber 110, as shown in FIG. 5D. The backfill gas in the UHV chamber 120 may allow the UHV chamber 120 to remain clean as it is transported from the bakeout chamber 130 to the high vacuum chamber 110 (e.g., by the mechanical hoist 140 in FIGS. 3C to 3A). After the UHV chamber 120 is reattached to the high vacuum chamber 110, the high vacuum chamber 110 and the UHV chamber 120 may pumped down to base pressure using the high vacuum pump 115 and the second high vacuum pump 126. The second high vacuum pump 126 may be configured to extract the backfill gas from the UHV chamber 120 with the UHV chamber 120 disposed on the high vacuum chamber 110.

Figure 5E:
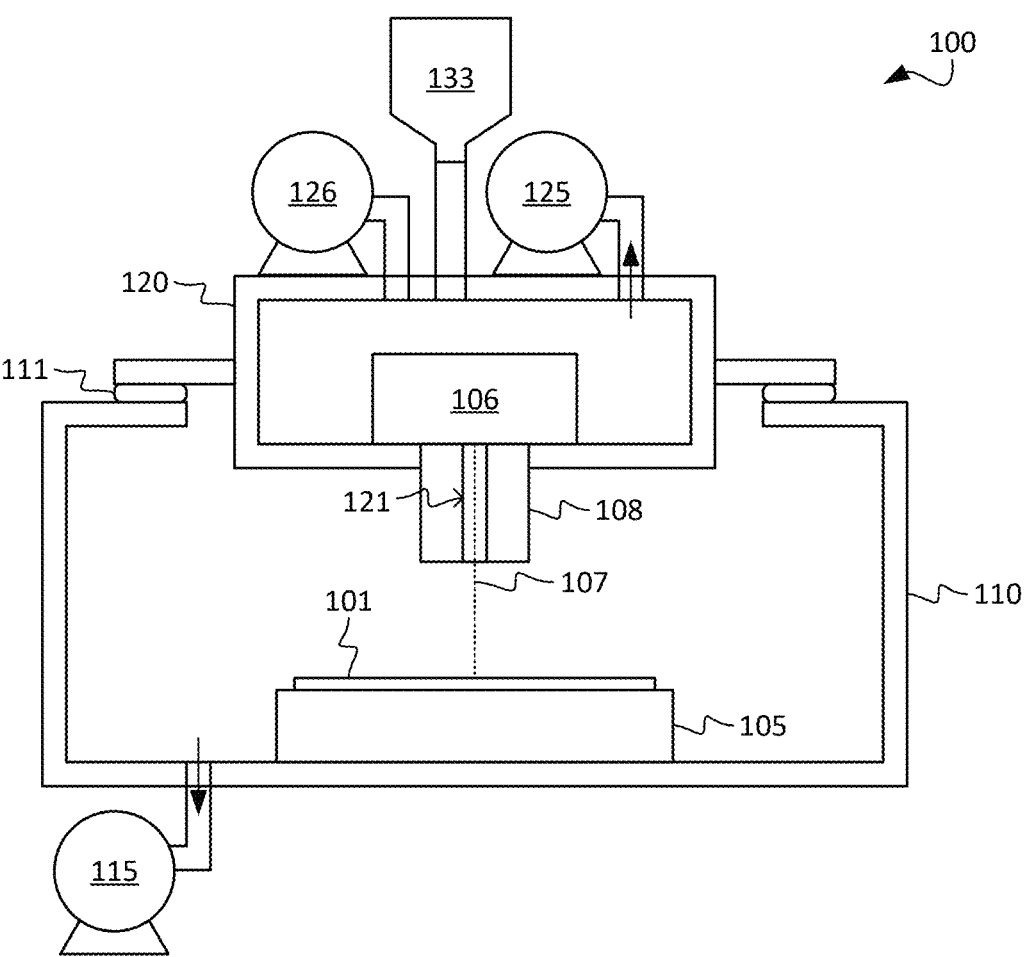

Once base vacuum level is reached, the second high vacuum pump 126 can be deactivated and the UHV pump 125 can be activated to further reduce the pressure in the UHV chamber 120, as shown in FIG. 5E. Accordingly, UHV or XUHV pressures can be achieved in the UHV chamber 120. Because the backfill gas provided in the UHV chamber 120 prevents the inflow of humid air after ex situ bakeout and during chamber transfer, there may be no need to perform an in-situ bakeout after the UHV chamber 120 is installed on the high vacuum chamber 110.

With the system 100, ex-situ bakeout of the UHV chamber 120 can be performed without a gate valve covering the differential aperture 121. This can enable a differentially pumped system to be quickly and easily baked out externally from the main tool, thereby reducing system downtime and throughput costs. This may be advantageous for small scanning electron microscope (SEM) columns, which may not have enough space for a gate valve to be integrated into the column.

Figure 6A:
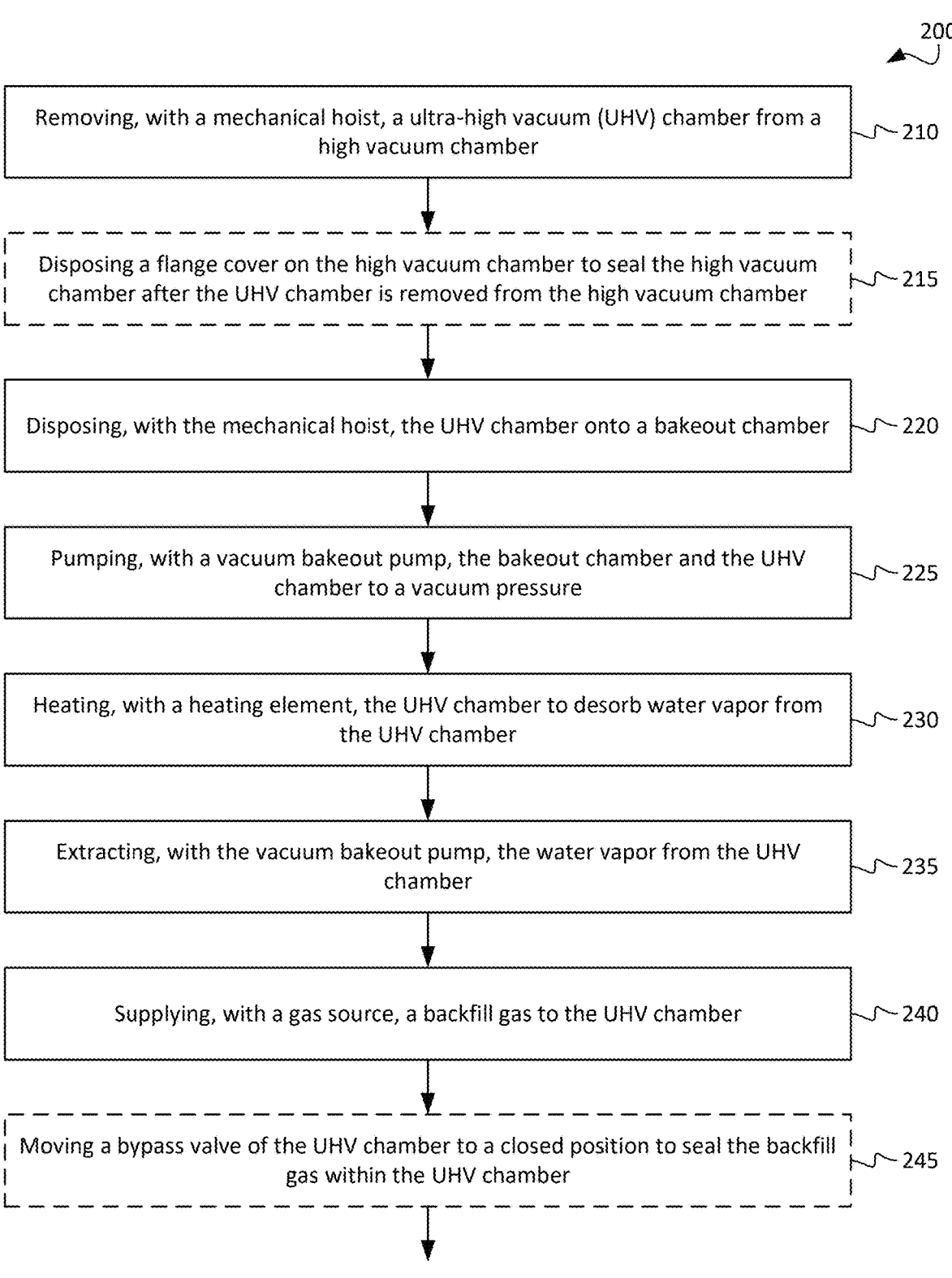
FIGS. 6A to 6B illustrate a flowchart of a method according to an embodiment of the present disclosure.
Figure 6B:
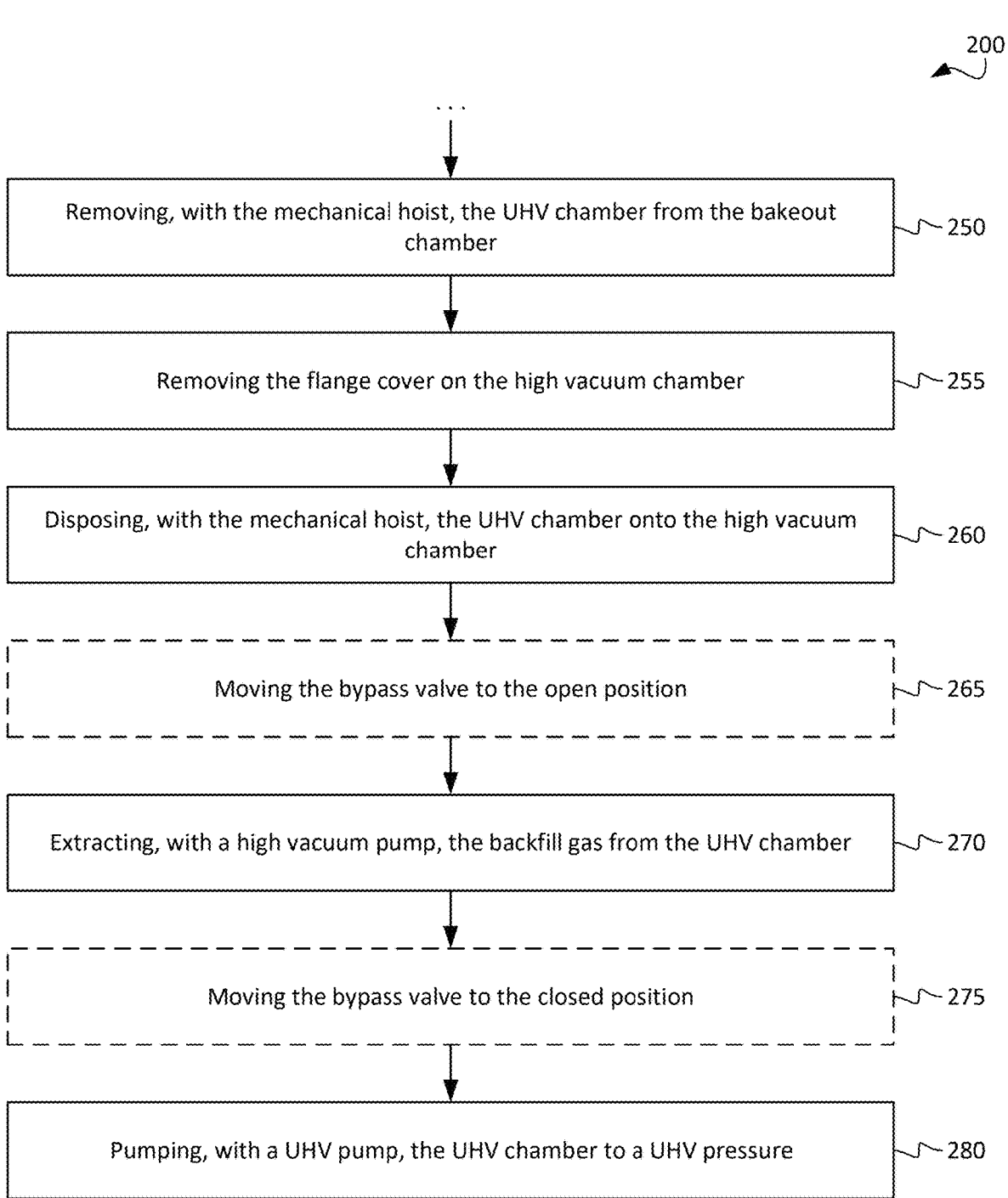

Another embodiment of the present disclosure provides a method 200. As shown in FIG. 6A and FIG. 6B, the method 200 may comprise the following steps.

At step 210, an ultra-high vacuum (UHV) chamber is removed from a high vacuum chamber with a mechanical hoist. While step 210 is described as being performed by a mechanical hoist, this step may be performed by other automated or manual means.

In some embodiments, after the UHV chamber is removed from the high vacuum chamber, the method 200 may further comprise step 215. At step 215, a flange cover can be disposed on the high vacuum chamber to seal the high vacuum chamber. Accordingly, a workpiece and components within the high vacuum chamber can be kept clean from contaminants. The high vacuum chamber can also be pumped down to vacuum or high vacuum pressures with a high vacuum pump with the flange cover sealing the high vacuum chamber.

At step 220, the UHV chamber is disposed onto a bakeout chamber with the mechanical hoist. While step 220 is described as being performed by the mechanical hoist, this step may be performed by other automated or manual means.

At step 225, the bakeout chamber and the UHV chamber are pumped to a vacuum pressure with a vacuum pump. The UHV chamber and the bakeout chamber may be in fluid communication via a differential aperture of the UHV chamber and the bypass valve in an open position. In some embodiments where there is not bypass valve, the bakeout chamber and the UHV chamber can be pumped to vacuum pressure by separate vacuum pumps connected to each chamber.

At step 230, the UHV chamber is heated with a heating element to desorb water vapor from the UHV chamber. The heating element may be a conductive heating element or a radiant heating element disposed inside the bakeout chamber. The heating element may be configured to heat the UHV chamber to a temperature of at least 100° C.

At step 235, the water vapor is extracted from the UHV chamber with the vacuum bakeout pump.

At step 240, a backfill gas is supplied to the UHV chamber with a gas source. The backfill gas may comprise, for example, Ar, $N_2$, or other dry, inert, gases.

At step 245, the bypass valve of the UHV chamber is moved to a closed position to seal the backfill gas within the UHV chamber. While the UHV chamber is still open to the atmosphere due to the differential aperture, the presence of the backfill gas in the UHV chamber may prevent contaminants from entering the UHV chamber via the differential aperture. In some embodiments where there is not a bypass valve, the method 200 may skip step 245 and proceed directly to step 250.

At step 250, the UHV chamber is removed from the bakeout chamber with the mechanical hoist. While step 250 is described as being performed by the mechanical hoist, this step may be performed by other automated or manual means. The UHV chamber may be filled with the backfill gas while the mechanical hoist is moving the UHV chamber from the bakeout chamber.

At step 260, the UHV chamber is disposed on the high vacuum chamber with the mechanical hoist. While step 260 is described as being performed by the mechanical hoist, this step may be performed by other automated or manual means.

In some embodiments, before the UHV chamber is disposed on the high vacuum chamber, the method 200 may further comprise step 255. At step 255, the flange cover is removed from the high vacuum chamber. Then the UHV chamber may be disposed on the high vacuum chamber in step 260.

At step 265, the bypass valve is moved to the open position. Accordingly, the UHV chamber and the high vacuum chamber may be in fluid communication via the differential aperture and the bypass valve. In some embodiments where there is no bypass valve, the method 200 may skip step 265 and proceed directly to step 270.

At step 270, the backfill gas is extracted from the UHV chamber with a high vacuum pump. The high vacuum pump may be in fluid communication with the high vacuum chamber. Accordingly, the high vacuum pump may extract the backfill gas from the UHV chamber via the bypass valve and the high vacuum chamber. Alternatively, the high vacuum pump may be directly connected to the UHV chamber to extract the backfill gas directly from the UHV chamber.

At step 275, the bypass valve is moved to the closed position. Accordingly, the UHV chamber may be sealed from the high vacuum chamber, but for the low conductance of the differential aperture. In some embodiments where there is no bypass valve, the method 200 may skip step 265 and proceed directly to step 280.

At step 280, the UHV chamber is pumped to a UHV pressure by a UHV pump. The UHV chamber can be pumped to higher vacuum levels than the high vacuum chamber using the UHV pump, which may be directly connected to the UHV chamber.

With the method 200, ex-situ bakeout of the UHV chamber can be performed without a gate valve covering the differential aperture. This can enable a differentially pumped system to be quickly and easily baked out externally from the main tool. This may be advantageous for small scanning electron microscope (SEM) columns, which may not have enough space for a gate valve to be integrated into the column.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
   an ultra-high vacuum (UHV) chamber including a differential aperture;
   a high vacuum chamber, wherein the UHV chamber is configured to be removably disposed on the high vacuum chamber, such that the UHV chamber is in fluid communication with the high vacuum chamber via the differential aperture;
   a high vacuum pump configured to produce a high vacuum pressure in the UHV chamber;
   a bakeout chamber, wherein the UHV chamber is configured to be removably disposed on the bakeout chamber, such that the UHV chamber is in fluid communication with the bakeout chamber via the differential aperture;
   a bakeout vacuum pump configured to produce a vacuum pressure in the bakeout chamber and the UHV chamber with the UHV chamber disposed on the bakeout chamber;
   a heating element configured to heat the UHV chamber and desorb water vapor from the UHV chamber with the UHV chamber disposed on the bakeout chamber, wherein the bakeout vacuum pump or the high vacuum pump is further configured to extract the water vapor from the UHV chamber; and
   a gas source configured to supply a backfill gas to the UHV chamber disposed on the bakeout chamber, and the high vacuum pump is further configured to extract the backfill gas from the UHV chamber with the UHV chamber disposed on the high vacuum chamber.

2. The system of claim 1, further comprising:

a chuck disposed in the high vacuum chamber, wherein the chuck is configured to support a workpiece; and an electron source disposed in the UHV chamber, wherein the electron source is configured to emit an electron beam through the differential aperture directed onto the workpiece.

3. The system of claim 1, further comprising:

a mechanical hoist configured to remove the UHV chamber from the high vacuum chamber and dispose the UHV chamber on the bakeout chamber, wherein the UHV chamber is filled with the backfill gas as the mechanical hoist moves the UHV chamber from the bakeout chamber to the high vacuum chamber.

4. The system of claim 1, further comprising:

a flange cover configured to be removably disposed on the high vacuum chamber and configured to seal the high vacuum chamber as the UHV chamber is removed from the high vacuum chamber.

5. The system of claim 1, wherein the backfill gas comprises Ar or $N_2$.

6. The system of claim 1, wherein the UHV chamber further includes a bypass valve that is movable between an open position and a closed position, such that in the open position, the UHV chamber disposed on the high vacuum chamber is in fluid communication with the high vacuum chamber via the bypass valve and the UHV chamber disposed on the bakeout chamber is in fluid communication with the bakeout chamber via the bypass valve.

7. The system of claim 6, further comprising:

a UHV pump configured to produce a UHV pressure in the UHV chamber with the bypass valve in the closed position.

8. The system of claim 6, wherein the gas source is configured to supply the backfill gas to the UHV chamber via the bakeout chamber through the bypass valve in the open position.

9. The system of claim 1, wherein the gas source is configured to supply the backfill gas directly to the UHV chamber.

10. The system of claim 1, wherein the heating element is a conductive heating element disposed within the bakeout chamber.

11. The system of claim 1, wherein the heating element is a radiant heating element disposed within the bakeout chamber.

12. A method comprising:

pumping, with a bakeout vacuum pump, a bakeout chamber and an ultra-high vacuum (UHV) chamber to a vacuum pressure, wherein the UHV chamber includes a differential aperture, and the UHV chamber is in fluid communication with the bakeout chamber via the differential aperture as the UHV chamber is removably disposed on the bakeout chamber;

heating, with a heating element, the UHV chamber to desorb water vapor from the UHV chamber;

extracting, with the bakeout vacuum pump, the water vapor from the UHV chamber; and supplying, with a gas source, a backfill gas to the UHV chamber.

13. The method of claim 12, wherein before pumping the bakeout chamber and the UHV chamber to the vacuum pressure, the method further comprises:

removing, with a mechanical hoist, the UHV chamber from a high vacuum chamber, wherein the UHV chamber is in fluid communication with the high vacuum chamber via the differential aperture as the UHV chamber is removably disposed on the high vacuum chamber; and disposing, with the mechanical hoist, the UHV chamber onto the bakeout chamber.

14. The method of claim 13, wherein after supplying the backfill gas to the UHV chamber, the method further comprises:

removing, with the mechanical hoist, the UHV chamber from the bakeout chamber; and disposing, with the mechanical hoist, the UHV chamber onto the high vacuum chamber.

15. The method of claim 14, wherein after disposing the UHV chamber onto the high vacuum chamber, the method further comprises:

extracting, with a high vacuum pump, the backfill gas from the UHV chamber.

16. The method of claim 15, wherein after extracting the backfill gas from the UHV chamber, the method further comprises:

pumping, with a UHV pump, the UHV chamber to a UHV pressure.

17. The method of claim 14, further comprising:

disposing a flange cover on the high vacuum chamber to seal the high vacuum chamber after the UHV chamber is removed from the high vacuum chamber.

18. The method of claim 17, wherein before disposing the UHV chamber onto the high vacuum chamber, the method further comprises:

removing the flange cover from the high vacuum chamber.

19. The method of claim 12, wherein the UHV chamber further includes a bypass valve that is movable between an open position and a closed position, the UHV chamber being in fluid communication with the bakeout chamber via the bypass valve in the open position as the UHV chamber is removably disposed on the bakeout chamber, and after supplying the backfill gas to the UHV chamber, the method further comprises:

moving the bypass valve to the closed position to seal the backfill gas within the UHV chamber.

20. The method of claim 12, wherein the backfill gas comprises Ar or $N_2$.

\* \* \* \* \*